Dec. 4, 1962     W. C. BOTELER     3,066,923
DUAL ACTION HUMIDIFIER APPARATUS
Filed Nov. 14, 1960     2 Sheets-Sheet 1

INVENTOR.
William Connett Boteler
BY
Hovey, Schmidt, Johnson & Hovey
ATTORNEYS.

United States Patent Office 3,066,923
Patented Dec. 4, 1962

3,066,923
DUAL ACTION HUMIDIFIER APPARATUS
William Connett Boteler, Kansas City, Mo., assignor to Puritan Compressed Gas Corporation, Kansas City, Mo., a corporation of Missouri
Filed Nov. 14, 1960, Ser. No. 68,735
12 Claims. (Cl. 261—64)

This invention relates to humidification equipment, and particularly to a device for adding moisture, or a combination of moisture and medication to a gas utilized for resuscitation or other therapeutic purposes. The instant humidifier is especially adapted for utilization in oxygen therapy.

In order to incorporate a required amount of liquid into a gas being administered for therapeutic purposes, the gas may be forced beneath the surface of a liquid and allowed to bubble upwardly therethrough to accomplish absorption of the liquid into the gas in a vapor state, or in the alternative, aspiration equipment may be utilized to properly humidify the gas. In the latter type of device, liquid is aspirated by means of a reduced pressure produced by a high velocity gas stream whereby the liquid discharged into such gas stream is divided into fine particles, a portion of which flash to vapor and the remainder of which are carried in suspension in the gas.

In the past it has been necessary to utilize individual humidifiers for bubbling the gas through the liquid or in the alternative, aspirating such liquid in order to incorporate a liquid into the initially dry gas. It is, therefore, the primary object of the present invention to provide a dual action humidifier, permitting bubbling of the gas through the liquid, or aspiration of the liquid as desired and by the simple expedient of rotating a control valve on the humidifier.

It is a further important object of the invention to provide humidification apparatus including a container adapted to receive a liquid with a head assembly being removably mounted on the structure and provided with novel, selectively operable valve means, and components for directing the gas below the surface of the liquid so that the same may bubble upwardly therethrough when the valve means is in one position thereof, and to effect aspiration of the liquid and thereby entrain liquid vapor and particles in the gas stream when the valve means is in the second position thereof, whereby both types of gas humidification may be carried out with the same device and with it only being necessary to shift the valve means in order to change the manner in which liquid is incorporated into the initially dry gas.

It is also an important object of the invention to provide a dual action humidifier as referred to above, wherein the construction and operation of the apparatus is simplified by virtue of the fact that the delivery tube for introducing gas below the surface of the liquid, when the valve control means is in one position thereof, also serves as means for delivering liquid from the supply thereof to the aspirating portion of the device when the control valve is in the other position of the same.

An additional important aim of the invention is to provide a dual action humidifier wherein the head assembly includes an air inlet passage communicating directly with the interior of the liquid container, as well as a second passage spaced from the air inlet passage communicating with the latter and also with an air distribution tube extending downwardly below the normal level of the liquid in the container, and with the valve means including a movable member provided with a spring biased ball thereon adapted to be disposed in closing relationship to the air inlet passage when the valve means is in one position of the same, and out of alignment with such air inlet passage when the valve means is in the opposite position thereof, to the end that when the ball valve closes the air inlet passage, dry gas entering the air inlet passage, is forced to flow into the second passage through the head assembly and thence downwardly through the distribution tube to a point below the surface of the liquid in the container, while disposition of the valve means in the other position thereof with the ball valve out of alignment with the air inlet passage, causes the dry gas to flow downwardly through the air inlet passage at a high velocity and effects aspiration of the liquid as the same is drawn upwardly through the distribution tube and thence into the air inlet passage in the form of particles or water vapor entrained in the gas.

Other important objects and details of the present invention will become obvious or be described in greater detail as the following specification progresses.

Figure 4:
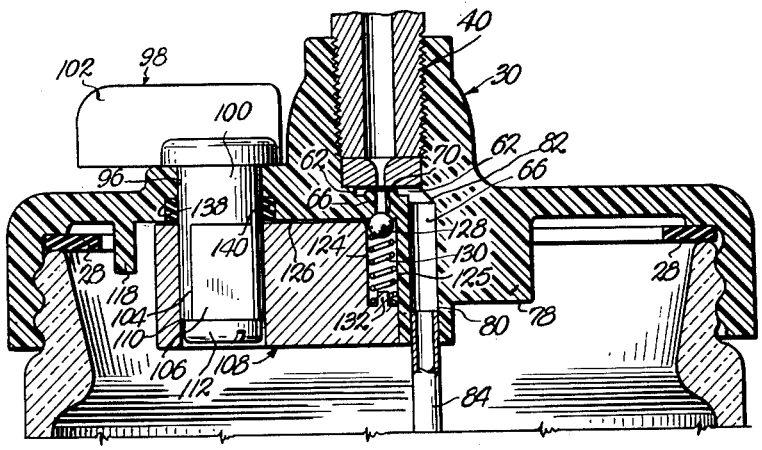
FIG. 4 is an enlarged, fragmentary, vertical, cross-sectional view taken on line 4—4 of FIG. 2.
Figure 5:
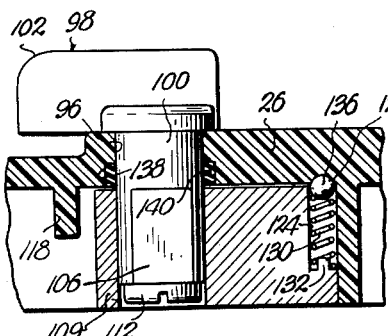
FIG. 5 is an enlarged, fragmentary, vertical, cross-sectional view taken on line 5—5 of FIG. 2 but with the selector valve in the position thereof indicated by the dotted lines.
Figure 6:
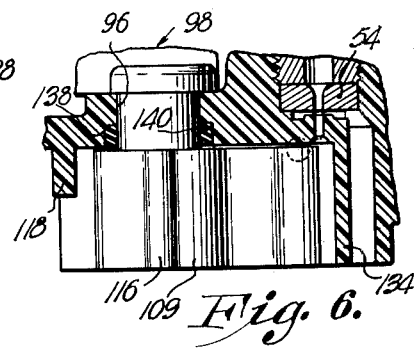
FIG. 6 is an enlarged, fragmentary, vertical, cross-sectional view also taken along the line 4—4 of FIG. 2 and with the selector valve being disposed in the dotted line disposition thereof illustrated in FIG. 2.

Humidification apparatus embodying the preferred concepts of the instant invention is broadly designated 10 in the drawings, and includes an open top container 12 which is most usually a glass jar or the like, as well as a head assembly 14 removably mounted on container 12.

Figure 3:
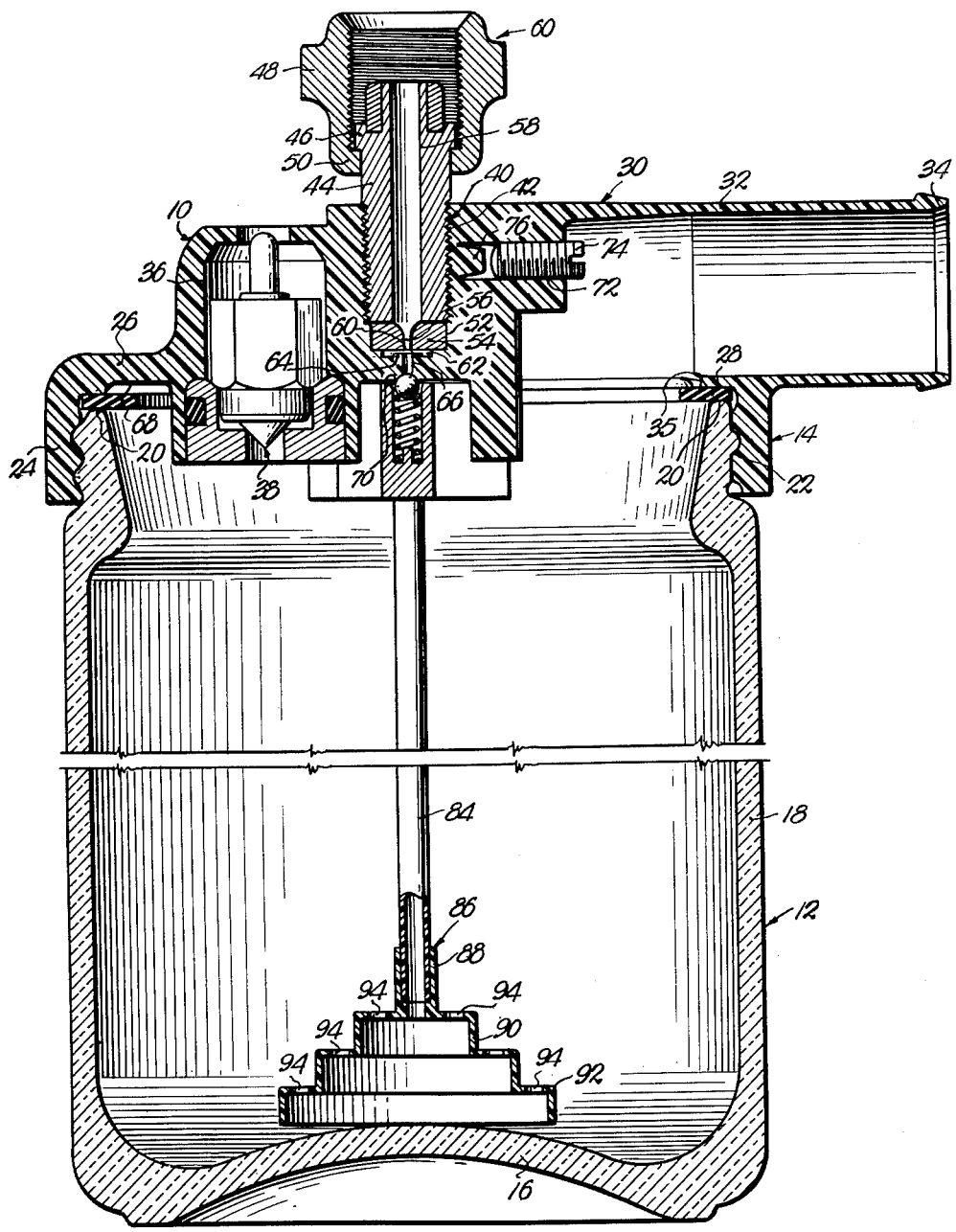
FIG. 3 is an enlarged, generally vertical, cross-sectional view taken on line 3—3 of FIG. 1 and illustrating a complete dual action humidifier unit as contemplated by the instant invention, certain parts thereof being broken away and in section.

As best shown in FIG. 3, container 12 is provided with a bottom wall 16, a cylindrical side wall 18, and a circular upper edge 20 defining an opening. The upper cylindrical margin of side wall 18 is externally threaded as at 22 and complementally receives the internally threaded flange portion 24 of head assembly 14. It is to be understood that liquid may be introduced into container 12 upon removal of head assembly 14, whereupon the upper margin 22 of cylindrical wall 18 of container 12 is again threaded onto the cylindrical flange portion 24 of head assembly 14.

Head assembly 14 also includes a circular top wall 26 integral with the peripheral flange portion 24 with an annular gasket 28 being provided within head assembly 14 against the under face of wall 26 in a position to engage the upper edge 20 of container 12 and thereby provide a seal when head assembly 14 is mounted on container 12 as shown in FIG. 3.

Head assembly 14 is also provided with a centrally disposed, integral, upstanding section 30 having a radially extending tubular portion 32 presenting a gas outlet tube terminating in a circular end margin 34. Wall 26 of head assembly 14 has an opening 35 therein, communicating the interior of container 12 with tubular portion 32. It is to be understood that tubular portion 32 is adapted to be coupled to a conduit for conveying the humidified gas to the patient. The extremity of section 30 remote from tubular portion 32, is provided with an upright, transversely irregular passage 36 therein, mounting pressure relief valve structure broadly designated 38 and forming no part of the present invention. It is to be recognized that when the pressure within container 12 exceeds a predetermined value, valve 38 opens to relieve the excess pressure.

Central section 30 is also provided with an upright main bore generally numerated 40, and intermediate tubular portion 32 and passage 36. The upper cylindrical portion 42 of section 30 defining a part of bore 40, is internally threaded as best shown in FIG. 3 and complementally receives an externally threaded conduit 44 provided with an integral, outwardly-extending flange 46 on the uppermost end thereof above central section 30. A coupling 48, rotatably mounted on the upper end of conduit 44 and having an inwardly projecting, annular flange portion 50 on the lower extremity thereof and disposed to complementally engage flange 46, is internally threaded and adapted to couple conduit 44 to a dry gas supply line.

The lower cylindrical wall portion 52 of section 30 and defining the lower extremity of bore 40, is smooth surfaced as illustrated in FIGS. 3 and 4, and an annular Venturi member 54 is mounted in the lower part of bore 40 directly below the lower end of conduit 44. Member 54 has a central passage 56 therethrough with the upper portion of passage 56 flaring outwardly to a diameter substantially equal to the width of elongated, centrally disposed, upright passage 58 in conduit 44, while the lower end of passage 56 is substantially narrower than passage 58 and terminates in an outlet orifice 60.

Central section 30 is also provided with an annular recess 62 concentric with bore 40 and communicating with the latter. The inner, transversely circular segment 64 of section 30 and defining the inner margin of recess 62, is spaced from the lower annular face of member 54 to thereby provide intercommunication between recess 62 and orifice 60 of passage 56.

The wall 26 of head portion 14 has an upright, gas discharge passage 66 coaxial with passages 56 and 58, with the lower surface 68 of wall 26 having an outwardly-flared recess 70 therein aligned with passage 66 and adapted to receive a ball valve as will be explained hereinafter.

Section 30 also has an internally threaded passage 72 therein at right angles to bore 40 and terminating within tubular portion 32, as shown in FIG. 3. A setscrew 74 threaded into passage 72, is adapted to engage an integral, coaxial projection 76 within passage 72 and extending away from conduit 44. It is to be seen that upon tightening of screw 74 against projection 76, a part of section 30 is biased into firm engagement with conduit 44 to effect a seal by virtue of closing off of a spiral path along the threads of conduit 44.

A downwardly-extending segment 78 of head assembly 14 and integral with the lower face 68 of wall 26, is provided with an upright passage 80 therein communicating with the interior of container 12 and terminating adjacent annular recess 62. Section 30 has a port 82 therein intercommunicating the upper end of passage 80 and recess 62. It should be pointed out that passage 80 is parallel with passages 58, 56 and 66, but is horizontally spaced therefrom.

An elongated distribution tube 84 telescoped into passage 80 in segment 78, extends downwardly into container 12 to a point adjacent bottom wall 16. A diffuser unit, broadly numerated 86, is carried by the lower end of tube 84 and includes a tubular upper portion 88 receiving the lower end of tube 84 therewithin, while a plurality of circular, transversely U-shaped ring elements 90 of gradually increasing diameter, integral with portion 88 and with one another, define the remainder of diffuser unit 86. The upper, generally horizontal, annular walls 92 of rings 90, are provided with a plurality of circumferentially disposed openings 94 therein, permitting gas to pass therethrough into the liquid within container 12. Diffuser unit 86 is located in close proximity to bottom wall 16 so that the gas must pass through a maximum quantity of the liquid, before exiting from apparatus 10 via tubular portion 32 of head assembly 14.

Wall 26 of head assembly 14 is also provided with a vertical passage 96 therein in spaced relationship to bore 40 for receiving selector valve means broadly numerated 98. A generally cylindrical pivot pin 100, rotatably disposed in passage 96 and extending downwardly into the interior of container 12, has an integral, outwardly projecting operating lever 102 on the uppermost end thereof. The portion 104 of pin 100 within container 12, has a pair of opposed, flat surfaces 106 so that the cross-sectional configuration of portion 104 is not truly cylindrical.

A valve member, broadly designated 108, is mounted on pin 100 and is provided with a cylindrical portion 109 having a passage 110 therethrough of cross-sectional configuration complemental with the cross-sectional shape of portion 104 of pin 100. A screw 112 is threaded into the end of pin 100 within container 12, and the head thereof overlies opposed portions of member 108 defining passage 110 therethrough to thereby removably retain member 108 on pin 100.

Figure 2:
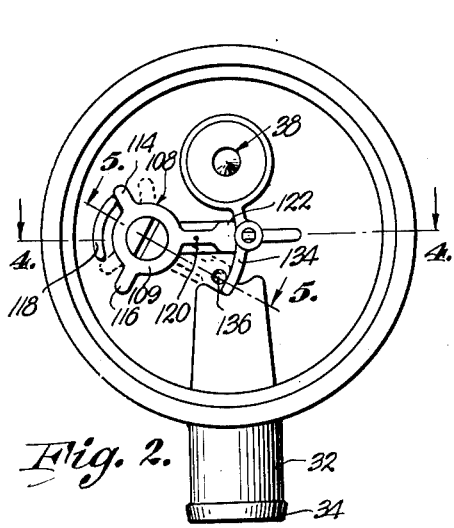
FIG. 2 is a bottom view of the head assembly as shown in FIG. 1.

Member 108 has a pair of radially-extending ribs 114 and 116 integral with portion 109 and disposed to engage a transversely arcuate stop 118 integral with, and depending from the lower face 68 of wall 26 remote from tube 84. Viewing FIG. 2, it can be seen that the ribs 114 and 116 alternately engage opposed ends of stop 118 to limit rotational movement of selector valve 98. Another somewhat longer rib 120, integral with portion 109 and extending toward tube 84, has an enlarged, vertical head portion 122 on the outer extremity thereof and provided with a vertical recess 124 in the vertical margin 125 thereof, extending from the upper face 126 of rib 120 downwardly through a major portion of the vertical height of head portion 122. As shown in FIG. 4, recess 124 is vertically aligned with passage 66 when lever 102 is in the position thereof as illustrated in this figure. A ball valve 128, reciprocable in recess 124, is biased toward top 26 by a coil spring 130 within recess 124, and engaging valve 128 and the head portion 122 respectively. An upwardly projecting, integral tab 132, extending into recess 124 and receiving the lower extremity of spring 130, prevents displacement of the latter from the recess.

The extremity 125 of rib 120 is in abutting relationship to a transversely arcuate wall 134 integral with the bottom face 68 of wall 26 and defining one surface of passage 80, as shown in FIG. 4. Face 68 of wall 26 is also provided with a spherical recess 136 therein in spaced relationship to passage 66, adjacent one extremity of wall 34 and along the curved path of travel of valve 128. Recess 136 is disposed to receive ball valve 128 when rib 116 is in engagement with the proximal edge of stop 118.

In order to assure a seal around selector valve 98, wall 26 is provided with an annular recess 138 in surrounding relationship to pin 100 and receiving an O-ring 140 coaxial with pin 100.

Figure 1:
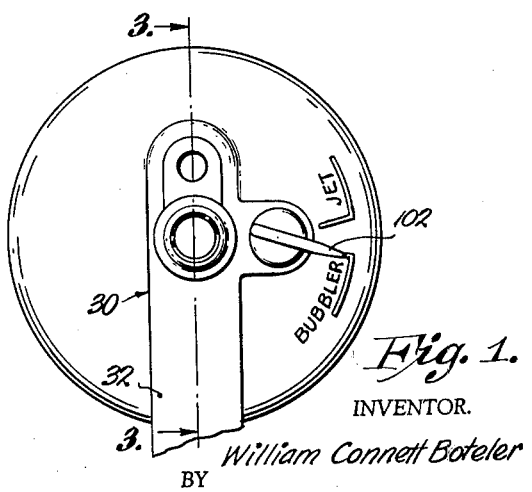
FIGURE 1 is a fragmentary view of a head assembly embodying the concepts of the present invention and showing the valve means thereon in one position of the same.

In operation, and assuming that lever 102 is in the position thereof illustrated in FIG. 1, it is to be understood that ball valve 128 is received in recess 70, thereby closing passage 66. It is also to be pointed out that container 12 is partially filled with a liquid such as water, coupling 44 is connected to a supply of dry gas, such as oxygen, and tubular portion 32 of head assembly 14 is connected to a patient supply tube. Upon delivery of gas to apparatus 10, the oxygen or other gas, passes downwardly through passage 58 in conduit 44, thence through passage 56, in the annular recess 62, next through port 82, downwardly through passage 80 and tube 84, and finally, into diffuser unit 86 where the gas is permitted to move upwardly through openings 94 in elements 90. As the gas bubbles upwardly through the liquid, a portion of the latter is entrained in the gas in a vapor state, whereby humidified gas is then directed to the patient via tubular portion 32.

In the event it is desired to incorporate water or other liquid into the dry gas through an aspiration procedure, this may be effected by simply shifting lever 102 to a disposition indicated by the word "jet" in FIG. 1, whereupon member 108 is swung about the axis of pin 100 to shift ball valve 128 into recess 136. Passage 66 is thereby opened and causing a gas stream of relatively high velocity to be discharged directly into container 12 above the level of liquid therein.

The high velocity gas stream is produced by the Venturi passage 56 and resulting in a pressure drop in annular recess 62, port 82, passage 80 and tube 84, whereby liquid is drawn upwardly from container 12 and discharged into the gas stream passing from passage 56 to passage 66. The liquid drawn upwardly from container 12 through tube 84, is divided into fine particles, a portion of which flash to vapor and are absorbed by the gas, and the remaining portion of which are carried in suspension in the gas. Again, it is to be recognized that the humidified gas is directed outwardly from apparatus 10 through the discharge tubular portion 32 of head assembly 14.

An important feature of the humidification apparatus 10 is the fact that changing the disposition of selector valve 98 so that the gas bubbles through the liquid in container 12 or in the alternative aspirates a quantity of the liquid therein, results in maintenance of the various bores and internally disposed passages in head assembly 14 in a clean and sanitary condition by virtue of reversing flow of the gas or liquid in such passages and bores.

Having thus described the invention what is claimed as new and desired to be secured by Letters Patent is:

1. In gas humidification apparatus, container means adapted to receive a quantity of liquid; a head assembly removably mounted on said container and having a dry gas inlet and a humidified gas outlet, said head assembly being provided with a pair of spaced passage means therein, each communicating with the interior of the container, and a port intercommunicating the passage means, one of said passage means being in communication with said dry gas inlet and having a discharge outlet; means on the head assembly for coupling said dry gas inlet to a source of gas under pressure; conduit means on said head assembly communicating with the other of said pair of passage means and extending downwardly into the container for communicating the lower portion of the same with said other passage means, the lower extremity of said conduit means normally being immersed in said quantity of liquid; means in said one passage for increasing the velocity of gas passing therethrough, and valve means carried by the head assembly and including movable means disposed in blocking relationship to the discharge outlet of said one passage means when the valve means is in one position thereof, said movable means being shiftable from said position to a location permitting gas to flow into the interior of said container through said one passage means whereby when the movable means is in said position thereof, the dry gas passes through the gas inlet, said one passage means, the port, said other passage means, the conduit means, and thence through the liquid for ultimate discharge through said humidified gas outlet, while, when the movable means is in said location thereof, gas is discharged into the interior of the container from said gas inlet and thence through said one passage means and producing a negative pressure in said port, the other passage means and said conduit means thereby causing liquid to be drawn upwardly through the conduit means, said other passage means and the port whereby liquid is directed into the dry gas stream flowing through said one passage means to effect humidification of the gas prior to discharge of the same through said humidified gas outlet.

2. Gas humidification apparatus as set forth in claim 1, wherein said means for increasing the velocity of the gas includes a segment provided with a Venturi passage therethrough coaxial with said one passage means.

3. Gas humidification apparatus as set forth in claim 1, wherein said port communicates with said one passage means at a point downstream from said means for increasing the velocity of gas in said one passage means.

4. Gas humidification apparatus as set forth in claim 3, wherein said segment is of annular configuration, separate from said head assembly and removably positioned in said one passage means.

5. Gas humidification apparatus as set forth in claim 4, wherein said head assembly is provided with an annular recess therein, coaxial with and surrounding said one passage means and communicating with the latter downstream from said means for increasing the velocity of said gas in said one passage means, said port being in communication with said annular recess.

6. Gas humidification apparatus as set forth in claim 1, wherein said head assembly is provided with means thereon disposed to be engaged by said movable means for limiting movement of the latter to a restricted arc.

7. Gas humidification apparatus as set forth in claim 1, wherein said movable means is provided with ball valve means thereon disposed to block the outlet of said one passage means when the movable means is in said one position thereof, and means carried by the movable means and engaging said ball valve means for biasing the latter toward said one passage means.

8. Gas humidification apparatus as set forth in claim 7, wherein said head assembly is provided with a recess therein coaxial with said one passage means and adapted to receive at least a portion of said ball valve means.

9. Gas humidification apparatus as set forth in claim 7, wherein said head assembly is provided with a recess therein spaced from said one passage means and adapted to receive at least a portion of said ball valve means when said movable means is in said location thereof.

10. Gas humidification apparatus as set forth in claim 1, wherein said movable means includes a pivot pin extending through said head assembly into the interior of said container, a lever secured to said pin exteriorly of the container for rotating the pin, a member secured to the pivot pin within the container and movable in response to shifting of said lever, a check valve mounted on said member and normally biased toward the head structure, said valve being disposed to block the outlet of said one passage means when the movable means is in said one position thereof.

11. In gas humidification apparatus, sturcture presenting a fluid-tight chamber adapted to receive a quantity of liquid, said structure being provided with an upper portion having a dry gas inlet, a humidified gas outlet spaced from said inlet, a pair of spaced passage means therein, each communicating with the chamber, and a port intercommunicating the passage means, one of said passage means being in communication with said dry gas inlet and having a discharge outlet; means on said structure for coupling said dry gas inlet to a source of gas under pressure; conduit means on said structure communicating with the other of said pair of passage means and extending downwardly into the chamber for communicating the lower portion of the same with said other passage means, the lower extremity of said conduit means normally being immersed in said quantity of liquid; means in said one passage for increasing the velocity of gas passing therethrough; and valve means carried by said upper portion of the structure and including movable means disposed in blocking relationship to the discharge outlet of said one passage means when the valve means is in one position thereof, said movable means being shiftable from said position to a location permitting gas to flow into the chamber through said one passage means whereby when the movable means is in said position thereof, the dry gas passes through the gas inlet, said one passage means, the conduit means, and thence through the liquid for ultimate discharge through said humidified gas outlet, while, when the movable means is in said location thereof gas is discharged into said structure from said gas inlet and thence through said one passage means and producing a negative pressure in said port, the other passage means and said conduit means thereby causing liquid to be drawn upwardly through the conduit means, said other passage means and the port whereby liquid is directed into the dry gas stream flowing through said one passage means to effect humidification of the gas prior to discharge of the same through said humidified gas outlet.

12. In fluid mixing apparatus, structure presenting a fluid-tight chamber adapted to receive a quantity of a first fluid, said structure being provided with an inlet for a second fluid, a mixed fluid outlet spaced from said inlet, a pair of spaced passage means therein, each communicating with the chamber of a port intercommunicating the passage means, one of said passage means being in communication with said second fluid inlet and having a discharge outlet; means on said structure for coupling said second fluid inlet to a source of said second fluid under pressure; conduit means on said structure communicating with the other of said pair of passage means and extending into the chamber to a point remote from said first passage means for communicating the chamber with said other passage means; means in said one passage for increasing the velocity of said second fluid passing therethrough; and valve means carried by said structure and including movable means disposed in blocking relationship to the discharge outlet of said one passage means when the valve means is in one position thereof, said movable means being shiftable from said position to a location permitting said first fluid to flow into the chamber through said one passage means whereby when the movable means is in said position thereof, the second fluid passes through the second fluid inlet, said one passage means, the conduit means, and thence into the first fluid for admixture therewith prior to discharge of the mixed fluid through said mixed fluid outlet, while, when the movable means is in said location thereof said first fluid is discharged into said structure from said first fluid inlet and thence through said one passage means and producing a negative pressure in said port, the other passage means and said conduit means thereby causing a portion of said second fluid to be drawn from the chamber, into and through the conduit means, said other passage means and the port whereby said second fluid is directed into the first fluid flowing through said one passage means to effect admixture of the fluids prior to discharge of the mixed fluid through said mixed fluid outlet.

References Cited in the file of this patent
UNITED STATES PATENTS

| | | |
|---|---|---|
| 1,438,926 | Leet | Dec. 12, 1922 |
| 2,300,774 | Cartmell | Nov. 3, 1942 |
| 2,539,148 | Malir | Jan. 23, 1951 |
| 2,778,619 | Goodyear | Jan. 22, 1957 |
| 2,968,474 | Eichelman et al. | Jan. 17, 1961 |